UNITED STATES PATENT OFFICE 2,429,275

ALKAMINE DERIVATIVES OF ORTHO AMINOMETHYL BENZOIC ACID

Robert P. Parker, Somerville, N. J., and Arthur J. Hill, New Haven, Conn., assignors to American Cyanamid Company, New York, N. Y., a corporation of Maine No Drawing. Original application April 16, 1942, Serial No. 439,236. Divided and this application January 18, 1946, Serial No. 642,098

5 Claims. (Cl. 260—472)

This invention relates to alkamine esters of substituted ortho aminomethyl benzoic acids.

According to the present invention it has been found that a series of alkamine esters of substituted orthoaminomethyl benzoic acids can be prepared, some of which compounds are local anesthetics. The compounds of the present invention may be represented by the following formula:

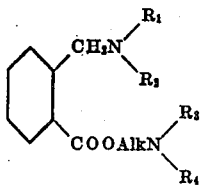

in which Alk is alkylene, $R_1$ and $R_2$ and $R_3$ and $R_4$ are members of the group consisting of lower aliphatic hydrocarbon radicals and a portion of a saturated heterocyclic ring.

The products form salts such as hydrochlorides, sulfates, borates, and the like with acids or they are capable of forming quaternary salts with alkyl halides such as the methiodide, ethobromide and the like.

While the products of the present invention are not limited to any particular process of making, we prefer to prepare them from the corresponding ortho aminomethylbenzoyl halide by reaction with the desired amino alcohol. The ortho aminomethylbenzoyl halide can be prepared from the corresponding acids by thionyl halides. Some ortho aminomethyl benzoic acids are known in the literature such as the diethylaminomethyl compound and all of them can be prepared simply by reaction of the corresponding amines with ortho cyanbenzylbromide followed by hydrolysis of the cyanide group in the usual manner with acid such as hydrochloric acid. The amino alcohols which can be used in the esterification reactions of the present invention are numerous. Not only can the simple alcohols be used such as β-diethylaminoethanol, β-diethylaminopropanol, γ-diethylaminopropanol, and γ-dibutylaminopropanol but other less common amino alcohols can be employed such as dibutylaminobutanols, β,β-phenylethylaminoethanol, β-dipropylaminoethanol, β-morpholinoethanol, β-piperidineoethanol, β-dicyclohexylaminoethanol, β-methylcyclohexylaminoethanol, β-phenylaminoethanol, β,β-dimethyl-γ-piperidinopropanol and the like.

The invention will be described in greater detail in conjunction with the following specific examples which are typical illustrations. The parts are by weight.

Example 1

β-Diethylaminoethyl-o-diethylaminomethyl benzoate

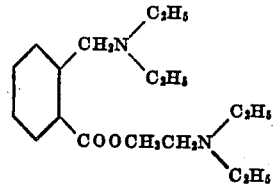

10 parts of the hydrochloride of o-diethylaminomethylbenzoyl chloride are suspended in 60 parts of ether and at gentle reflux, 11 parts of β-diethylaminoethanol in 50 parts of ether are added. After refluxing for three hours, the reaction mixture is filtered. After removal of the ether from the filtrate, the residual oil is distilled under reduced pressure. The β-diethylaminoethyl-o-diethylaminomethyl benzoate is an oil (boiling point 157°–160° C. at 4 mm.). This base is converted to the dihydrochloride salt through its solution in ether and addition of dry hydrogen chloride. The precipitated dihydrochloride is washed with dry acetone and when dry, melts at 170–174° C. The monohydrochloride is prepared by solution in an equivalent quantity of aqueous acid.

The o-diethylaminomethylbenzoyl chloride employed in the above preparation is obtained in the following manner:

20 parts of the hydrochloride of o-diethylaminomethylbenzoic acid are treated with 74 parts of thionyl chloride at 40–50° C. After filtration of the reaction mixture, the excess thionyl chloride is removed by reduced pressure distillation, and the residual liquor is poured into cold dry ether. It slowly solidifies whereupon the solid is separated by filtration. By repeated trituration in ether and filtration, the pure acid chloride is obtained.

Example 2

β-Dibutylaminoethyl-o-diethylaminomethyl benzoate

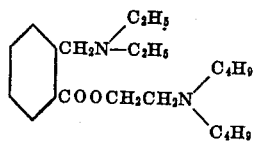

10 parts of the hydrochloride of o-diethylaminomethylbenzoyl chloride are suspended in 85 parts of ether and at reflux temperature 23.8 parts of β-di-n-butylaminoethanol are added. On completion of reaction, the temperature is lowered to 5° C. and 50 parts of water and 20 parts of caustic are added. The separated oily material is extracted by ether, the extract being dried over anhydrous sodium sulfate; and, after filtration, the ether is removed by distillation. The β-di-n-butylaminoethyl (o-diethylaminomethyl) benzoate is purified by distillation under reduced pressure (boiling point 194–196° C. at 5 mm. mercury). The hydrochloride salts of this base are extremely hygroscopic and may be obtained by precipitation from ether with dry hydrogen chloride. The precipitate as a solid is difficult to maintain in a friable form because of its hygroscopic nature.

*Example 3*

γ-Diethylaminopropyl-o-diethylaminomethyl benzoate

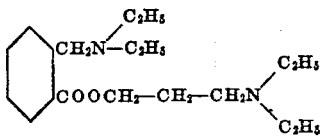

10 parts of the hydrochloride of o-diethylaminomethylbenzoyl chloride are suspended in 85 parts of ether. The suspension is heated to reflux and 25 parts of γ-diethylaminopropyl alcohol in 50 parts of dry ether are added slowly. When addition is complete, the reaction mixture is heated for 6½ hours, then the temperature is lowered to 5° C. and 50 parts of water and 25 parts of caustic are added. The precipitated oil is extracted with ether, the ether extract is dried over anhydrous sodium sulfate, the ether solution is clarified, and the ether is removed by distillation. The residual oil is subjected to distillation under reduced pressure and the γ-diethylaminopropyl (o-diethylaminomethyl) benzoate is purified by distillation under reduced pressure (boiling point 139–140° at 5 mm. mercury).

The free base may be converted to its hydrochloride salt by treatment with dry hydrogen chloride in dry ether solution.

*Example 4*

β-Diethylaminoethyl-o-dibutylaminomethyl benzoate

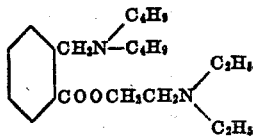

48 parts of cold dry pyridine are added to 12 parts of the hydrochloride of o-di-n-butylaminomethylbenzoyl chloride and stirring is maintained until all solid is dissolved. While still cold, 10 parts of β-diethylaminoethyl alcohol are added and the mixture is stirred while cold during the vigorous reaction. The reaction mixture is then stirred as the temperature is slowly allowed to rise, and finally the reaction mixture is warmed on a steam bath for three hours. The temperature is then lowered by stirring in an ice bath while 50 parts of water and 85 parts of ether are added, and 20 parts of caustic are dissolved. The ether layer is separated and is washed with fresh water. It is dried over anhydrous sodium sulfate, filtered, and the ether is removed by distillation. The β-diethylaminoethyl (o-di-n-butylaminomethyl) benzoate is purified by distillation under reduced pressure (boiling point 154–155° C. at 4 mm. of mercury).

The salts of this base are prepared by precipitation with dry hydrogen chloride from a dry ether solution.

The hydrochloride of o-di-n-butylaminomethyl benzoyl chloride used in the above preparation is obtained in the following manner:

107 parts of o-cyanbenzylbromide are suspended in 275 parts of ether and at reflux temperature 142 parts of n-dibutylamino are added. Reflux is continued until the reaction is complete, and after filtration of the precipitated n-dibutylamine hydrobromide, the ether is removed by distillation. The o-di-n-butylaminomethyl benzonitrile is purified by distillation under reduced pressure (boiling point 133°–136° C. at 5 mm. of mercury). This base gives a hydrochloride which, when pure, melts at 119–120° C. 28.5 parts of this nitrile are dissolved in 450 parts of hydrochloric acid (1.19) and refluxing is maintained for 17 hours. After evaporation to a thick mass, and neutralization by the addition of caustic, the resulting alkaline solution is evaporated to dryness to expel all ammonia. The residue is dissolved in dilute hydrochloric acid, filtered, and again evaporated. The solid is dried over silica gel and the resulting hydrochloride of o-di-n-butylaminomethyl benzoic acid when pure melts at 180–182° C. 44 parts of thionyl chloride are added to 15 parts of the hydrochloride of this acid with cooling. When addition is complete, the temperature is raised to 40–45° C. for 1 hour, then 50–60° C. for 1 hour, and finally to 60–70° C. for two hours. The excess thionyl chloride is removed by distillation under reduced pressure, and the residual liquid is taken up in 35 parts of dry ether. The ether is removed by distillation under reduced pressure. Repeated solution in fresh ether and distillation removes all excess hydrochloric acid and thionyl chloride. The resulting hydrochloride of o-di-n-butylaminomethyl benzoyl chloride is ready for use in the preparation of the above-described ester.

*Example 5*

β-Dibutylaminoethyl-o-dibutylaminomethyl benzoate

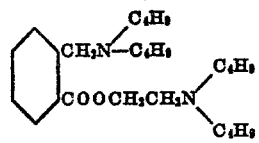

48 parts of cold dry pyridine is added to 12 parts of the hydrochloride of o-di-n-butylaminomethyl benzoyl chloride and while stirring in an ice bath, 14 parts of β-di-n-butylaminoethanol are added. After the first vigorous reaction, the mixture is placed under a reflux condenser and stirred for 2 hours, and then heated for 2 hours on the steam cup. The temperature of the reaction mixture is then lowered and 50 parts of water and 85 parts of ether are added, and while stirring, 20 parts of caustic are dissolved. The ether layer is separated, is washed with fresh water, is dried with anhydrous sodium sulfate, is filtered and the ether is removed by distillation. The resulting β-di-n-butylaminoethyl (o-di-n-butylaminomethyl) benzoate is purified by distillation under reduced pressure. It is necessary to redistill this material to obtain it as a pure compound (boiling point 202°–204° C. at 4 mm. mercury).

This base may be converted to its hydrochloride

Example 6

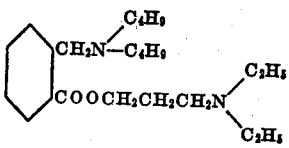

12 parts of the hydrochloride of o-di-n-butyl-aminomethyl benzoyl chloride are treated in pyridine solution with 11 parts of γ-diethylaminopropyl alcohol according to the procedure described in the case immediately preceding. Following a similar method in isolating the product, the γ-di-ethylaminopropyl (o-di-n-butyl-aminomethyl) benzoate is purified by distillation under reduced pressure (boiling point 198°–201° C. at 4 mm. of mercury).

The hydrochloride may be formed by precipitation from dry ether solution by the addition of anhydrous hydrogen chloride, or by solution of the base in the desired quantity of aqueous acid.

The salts of the esters described in the foregoing examples may be prepared by suitable reaction with the corresponding acids. Thus the hydrochlorides are obtained by treating the esters with dry hydrogen chloride in ether solution.

In the examples the hydrochloride of the aminomethylbenzoyl chloride is described as this is the cheapest acid halide and since the reaction proceeds smoothly with good yield there is nothing to be gained by using the corresponding bromides which work smoothly but do not present sufficient advantage to justify their higher cost.

This application is a division of our copending application Serial No. 439,236, filed April 16, 1942.

We claim:

1. An amino alcohol ester of an o-aminomethylbenzoic acid having the formula:

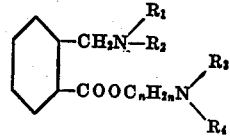

in which $R_1$ and $R_2$ and $R_3$ and $R_4$ are members of the group consisting of lower aliphatic hydrocarbon radicals and a portion of a saturated heterocyclic ring, and $n$ is an integer not greater than four.

2. An ester according to claim 1 in which the aminomethyl group is diethylaminomethyl.

3. A β-diethylaminoethyl-o-diethylaminomethyl benzoate.

4. A γ-diethylaminopropyl - o - diethylaminomethyl benzoate.

5. A γ-dibutylaminoethyl-o-diethylaminomethyl benzoate.

ROBERT P. PARKER.
ARTHUR J. HILL.

REFERENCES CITED

The following references are of record in the file of this patent:

FOREIGN PATENTS

| Number | Country | Date |
|---|---|---|
| 172,447 | Germany | Nov. 16, 1905 |

OTHER REFERENCES

Gilman et al., "Jour. Pharm. Exp. Ther." vol. 74, pp. 304–306 (1942).

Einhorn, "Annalen der Chem.," vol 300, pp. 156, 162 (1898).